United States Patent Office 2,912,469
Patented Nov. 10, 1959

2,912,469

FRACTIONAL CRYSTALLIZATION PROCESS

Herbert F. Wiegandt, Ithaca, N.Y., assignor to Monsanto Chemical Company, St. Louis, Mo., a corporation of Delaware No Drawing. Application March 16, 1955
Serial No. 494,815

10 Claims. (Cl. 260—650)

This invention relates to a process for separating components of a mixture of chemicals. More specifically this invention pertains to the separation and the purification of a component of a mixture of chemicals. One specific embodiment of this invention relates to the continuous separation and purification of a component of a binary mixture by a continuous crystallization process.

In some cases distillation can be employed in industrial applications to separate components from a multicomponent mixture where there is sufficient difference between the boiling points of the components and where these boiling points do not exceed the range obtainable in industrial operations. When dealing with mixtures of materials which have relatively high boiling points or which are thermally unstable or which contain impurities, separation of the various components can be achieved by extraction or crystallization processes.

Industrial crystallization is a unit operation particularly advantageous for the separation of a component from multicomponent mixtures of chemicals where the boiling points of the components are relatively close, or where the materials are temperature sensitive and where the production of a product of extremely high purity is desired or required. However, useful as it may be for industrial application, commercial crystallization as a production tool has not achieved the success and favor as a unit operation as it should because of the cumbersome, tedious and somewhat untidy methods heretofore in use or available for use.

Crystallization usually brings to mind the concentration and/or cooling of a multicomponent mixture until there is reached a temperature and/or concentration at which one component is no longer soluble in the remainder or a temperature at which one component is a solid while the others are still liquid. The slurry resulting is transferred to some means for separating the liquid phase from the solid phase such as a pressure or vacuum filter, a centrifuge or settling apparatus where the liquid phase can be drawn off or poured off.

The cumbersome processes in use or available for use include such steps as drip-and-drain or sweating procedure, scraping cooling, flash cooling, centrifugation and filtering in various combinations. Flash cooling creates a turbulence which prevents crystals from settling out. Scraper cooling, the mechanical scraping of cooled surfaces, results in mechanical abrading of the crystals as well as the scrapers and cooled surfaces. Also plugging of the system results where scraper cooling is employed. Separation of the liquid or melt from the crystals involves transfer of the slurried mixture generally to mechanical separating devices such as filters and centrifuges.

The separation and purification of one component from a multicomponent mixture of chemicals by a crystallization process generally involves crystallization and many recrystallization steps. After the crystalline product is obtained from the crystallization process, the solid product is melted or dissolved in a suitable solvent. Then another partial crystallization of this melted or redissolved solid product gives a second crystal product which is richer in the desired component than the crystals of the first crystallization process. This procedure of melting or redissolving the crystals and partial recrystallization is repeated until a product of desired purity is obtained. The liquor from the first step, if the original mixture was a two component system, is subjected to further coolings and removal of solid materials until a liquor of desired purity is obtained. Usually crystals and liquors of intermediate purity obtained from the purification of the desired solid and desired liquor are returned to the first crystallization. Such process steps do not lend themselves readily to continuous operation since each fractional crystallization step is a batch operation within itself from which crystals and liquor are subjected to separate crystallizations and recrystallization. But the crystallization process of any one step may be continuous, i.e. crystals in that step are continuously formed, multicomponent mixture continually fed and liquor continuously removed.

The floor space required for the operation of crystallization and recrystallization processes as described above is large as are the labor and equipment costs which amount to a sizeable portion of the processing costs for recovery and purification. A truly continuous process which substantially reduces equipment, maintenance and other processing costs while at least maintaining the desired capacity would be much desired.

Continuous fractional crystallization processes have been proposed which employ extractive solvents as a means for removing one component from a multicomponent system in a first zone, crystallizing this one component from solution in the extractive solvent in a second zone, moving the crystals by gravity or by scrapers to a third zone where they are removed or remelted and redissolved for further recrystallization in a subsequent zone. Obviously, such a process still possesses the inherent drawbacks of scraper-coolers, filters, etc. of the batch processes.

It is a primary object to provide a crystallization process for recovery of a chemical component of a multicomponent mixture of chemicals devoid of mechanical scraping or separation, separate handling of solids or slurries of liquor and solids but by which both the desired component and the remainder of the multicomponent mixture are removable as liquids.

Another object of this invention is to provide a fractional crystallization process for separating and purifying a chemical component of a multicomponent mixture of chemicals.

Still another object of this invention is to provide a continuous fractional crystallization process for separating and purifying a chemical component of a multicomponent mixture of chemicals without employing solvents or extractive solvents.

Further objects of this invention are to provide a continuous fractional crystalliaztion process which decreases the costs of maintenance and equipment in crystallization processes while increasing output capacity of separation of various components of a multicomponent mixture.

Other objects and advantages will appear obvious to those skilled in the art from the following disclosure and description.

The present invention comprises a crystallization process wherein a liquid containing a multicomponent chemical composition, the components thereof being at least partially separable from each other by crystallization, is contacted with an immiscible liquid sufficiently cool to cause the formation of solid phase richer in the crystallizable component of the multicomponent composition than the original multicomponent composition. The immiscible liquid shall be sufficiently cool for the purposes of this invention when it is at a temperature below the crystallization temperature of the crystallizable component of the multicomponent composition, but not so low as to cause crystallization of all of said composition, i.e. the temperature and rate of introduction of the immiscible liquid must be such as to cause only a portion of said composition to crystallize, and preferably substantially only the crystallizable component. In carrying out the process of this invention, the immiscible liquid when heavier than the liquid charge containing the multicomponent composition can be conveniently fed at or above the upper level of the liquid charge in a heat exchange zone. When the immiscible liquid is lighter than liquid charge, it is fed at some point below the upper liquid level. The process of this invention can also be carried out by feeding into the immiscible liquid the liquid charge.

By crystallizable component is meant a solid other than that of eutectic composition which forms on cooling a liquid multicoponent chemical composition.

It is preferred in the practice of this invention that the addition of either the liquid when added to the liquid containing the multicomponent composition or the liquid containing the composition when added to the immiscible cooling liquid be made in the form of drops or droplets, as by spraying, so that discrete portions of one liquid is in contact with the other liquid.

A further embodiment of this invention comprises accumulating crystals rich in the crystallizable component of the multicomponent composition preferably in a zone separate from that of the heat exchange zone. An additional embodiment of the process of this invention comprises the heating of at least a portion of the accumulated crystals by indirect heat exchange to a temperature of at least, but preferably not substantially above their melting point and removing the resulting melt. A still further embodiment of this invention which permits further purification of the crystallizable component comprises heating a portion of the accumulated crystals to a temperature of at least but preferably not substantially above their melting point and permitting this melt to contact the immediately adjacent accumulated crystals, thereby removing from these crystals a portion of the other components, producing from these crystals a melt increasingly enriched in the crystallizable component preferably until optimum purification is obtained and then removing at least a portion of this further enriched melt.

The above described process of this invention is applicable to both batch and continuous operations. The process of this invention can conveniently be carried out in any vertical vessel, but preferably is carried out in a vertical tubular vessel. By tubular vertical vessel is meant a vessel whose length is two or more times the diameter or greatest dimension through a horizontal cross section of the vessel. Although the process of this invention is not limited to a vessel of any particular size or shape, it is most conveniently carried out in a cylindrical vessel.

A preferred embodiment of this invention, when applied to the separation and purification of a component of a multicomponent chemical composition at least partially separable by crystallization by continuous fractional crystallization, is carried out in the following manner. A melt of the multicomponent composition at or about its melting point is fed into a suitable vessel at some point intermediate the top and bottom of the vessel until a suitable depth of melt has been provided, and then while continuing the feed of said melt, a sufficiently cool immiscible liquid is introduced into the melt in the vessel. As the particles of the immiscible liquid pass through the melt of the multicomponent composition, a supercooled trail behind the immiscible liquid is formed. In this supercooled trail takes place formation of crystals higher in the crystallizable component than the multicomponent composition. This zone of contact between the immiscible liquid and the melt of the multicomponent composition is, of course, the initial heat exchange zone, and is the zone where the immiscible liquid contacts the melt of the multicomponent composition in a heat exchange relationship.

It is most advantageous and therefore preferred that the immiscible liquid be one which has a density greater than the density of the melt of the multicomponent composition of chemicals to be separated. In some cases, it is desirable that the immiscible liquid be one that has a density greater than that of the crystals of the crystallizable component so that when these crystals are formed, there is provided the optimum driving force to provide a stable compact bed of crystals at or near the bottom of the vessel. In cases where the crystallizable component of the multicomponent composition readily forms a stable dense bed made up of crystals of higher density than the melt, it is advantageous to employ an immiscible liquid having a density between the density of the melt of the multicomponent composition and the density of the solid phase. In cases where the solid richer in the crystallizable component forms a solid porous mass at an apparent density lighter than the melt of the multicomponent composition, it is also advantageous to employ an immiscible liquid of density intermediate the density of the melt and the apparent density of the porous solid. The use of an immiscible liquid of a density less than the density of the solid phase formed by cooling a melt of a multicomponent composition and less than the density of the residual melt also can be advantageous.

Proceeding with the continuous process, as the immiscible liquid passes through the melt of the multicomponent composition, crystals enriched in the crystallizable component of the composition form in the trail of the supercooling behind the particles of the immiscible liquid. This newly formed enriched solid phase is permitted to pass into a zone where it is heated until remelted and at least a portion of this newly formed melt is withdrawn. In the process of this invention, there is also formed a melt leaner in the crystallizable component than the original feed melt of the multicomponent composition and since the process is being operated continuously, this leaner melt is also withdrawn from the vessel. To prevent an accumulation in the vessel of the immiscible liquid, it too is withdrawn preferably at a position in the vessel where a sharp clear-cut interface between the immiscible liquid and a melt is formed.

According to the most preferred embodiment of this invention, the solid phase of the enriched crystals accumulates in a zone provided with a means for heating to the melting point at least a portion of the newly solidified material, this solid phase is heated to at least but not substantially above its melting point. This new enriched melt is permitted to contact at least a portion of the crystals immediately adjacent to the melting zone. Contact between the newly formed melt and the crystals causes a removal of at least a portion of the other components of the multicomponent composition from the crystals. These crystals after contact with the newly formed melt are in turn melted, and at least a portion of their melt contacts other crystals. This continuous heating and purification in the heating zone and the zone immediately adjacent thereto is permitted to continue preferably until the optimum purification is achieved. Thereafter at least a portion of the enriched melt is removed from the vessel. From then on the process is carried out with continuous feeding of the melt of the multicomponent composition, continuous feeding of the immiscible liquid, the continuous removal of the desired product enriched in the crystallizable component of the multicomponent composition, the continuous removal of a melt leaner in the crystallizable component of a multicomponent composition and the continuous removal of the warmed immiscible liquid.

There is available for the purpose of this invention a wide variety of immiscible liquids. Where the materials in the multicomponent composition are insoluble in water and will not react with water, water and aqueous solutions of inert materials can be employed as the immiscible liquid in the process of this invention. When aqueous solutions are employed as the immiscible liquid in the process of this invention, the density of the immiscible liquid can be adjusted to suit operating conditions by increasing or decreasing the amount of water-soluble material in the solution. The choice of materials to be dissolved in water to make the aqueous immiscible liquid may also be varied. Where the initial temperature of the immiscible liquid need be low, a material having a high solubility in water at low temperatures is employed. Thus when an aqueous immiscible liquid system is to be used at temperatures of about 0° C. or below, such materials as antimony chloride, ammonia, ammonium acetate, ammonium formate, ammonium nitrate, di-ammonium phosphate, ammonium bisulfate, ammonium thiocyanate, cadmium nitrate, calcium nitrate, ortho phosphoric acids, potassium acetate, potassium carbonate, potassium formate, potassium iodide, potassium nitrate, potassium thiocyanate, sodium acetate, sodium bromide, zinc bromide, zinc chloride, zinc iodide and other materials having a solubility in water at 0° C. of 100 parts by weight or more per 100 parts of water can be used. Other inorganic and organic water-soluble materials can be advantageously employed where the temperature of the immiscible aqueous liquid is initially at about 20° C. or above. In addition, the aqueous systems need not be limited to the solution of one water-soluble material. A combination of mutually compatible inorganic and/or organic water-soluble substances can be employed.

Liquid organic compounds or solutions of organic or inorganic compounds in organic compounds may also be employed in the process of this invention where they are inert and are not solvents for either the multicomponent composition or any one of the components thereof.

In some cases, the immiscible liquid heat exchange material may be a substance which is a gas at ordinary temperatures and thus when employed in a liquid form, the heat of vaporization of such a material is utilized for removing heat from a melt of the multicomponent composition to be separated. Also, the formation and movement of the vaporized material through the melt can be utilized to form a cellular or sponge-like solid and cause it to float on the residual liquid. Liquid carbon dioxide and ammonia, among others, can be employed in this manner. For example, liquid ammonia can be employed to further cool a mixture of oil and wax cooled to the cloud point before charged to the closed system. The vaporizing ammonia removes heat from the oil-wax mixture causing the wax to separate from the oil as a solid. However, since the vaporized ammonia continues to expand, the wax is formed as a cellular solid which will float on the dewaxed oil. Since such a process would be carried out in a closed system, the ammonia can be readily recovered, liquefied and recycled for reuse.

Low boiling inert immiscible organic liquids may also be used in the process of this invention where such an organic compound is introduced below the liquid level of the melt of the multicomponent mixture and where the change of the organic material from a liquid to a vapor is enhanced by maintaining the vapor space in the vessel at reduced pressure. Such a modification of the process of this invention will also find use in forming the desired product as a cellular product.

The process of this invention is exceptionally useful, for example, in cases where the crystallization points of two isomers are relatively close together but different, and where the mixture of the melt of the two components when cooled forms a solid having a composition differing from that of the melt. In such a case, a melt or solution of the binary mixture of the isomers is prepared, a liquid solution of the mixture in a suitable solvent being useful when the mixture of the two isomers will not melt without decomposition. For example, a melt of a binary mixture of isomers is fed into a vessel and, if the separation is to be carried out according to the most preferred embodiment of this invention in a continuous process, contacted in direct heat exchange relationship with an immiscible liquid such as an immiscible inert aqueous system having a density greater than the density of the melt of the binary mixture of the isomers, and being sufficiently cool to cause solidification of a mixture rich in the highest melting component (here assumed to be the para isomer) but not sufficiently cool to cause the solidification of the entire melt. Where there is a sufficient density difference between the density of the solid enriched in the para isomer and the density of the melt to aid in the separation and formation of a stable, dense crystalline bed of crystalline product, then the immiscible liquid should have a density between that of the melt and that of the solid formed. But, when the crystallized solid material does not form a dense bed of crystals because of the shape of the individual particles or because the difference in density between the solid and the mother liquor melt is not sufficiently widespread, then the use of an immiscible liquid having a density greater even than that of the crystalline solid formed will be advantageous. In either case, the immiscible liquid will separate the solid and the melt because it is heavier than the melt and because it is immiscible with the melt. In the latter case, in addition to causing the melt to be separated from the crystalline product formed, the immiscible liquid being heavier than the solid will provide additional driving force aiding in the formation of a dense bed of crystals and neutralize the effects of any upward currents produced, as for example, by the upward movement of the melt of the newly formed crystalline solid during the further purification.

Where the solidified product being separated from the multicomponent composition is being formed as a cellular solid, a means for heating this solid as it floats in the upper part of the vessel is employed. There is also inserted in the upper portion together with the heating means a means for removing at least a portion of the new melt there formed.

Where the solid product being separated from the multicomponent composition forms as a product heavier than the residual melt, it of course settles toward the bottom of the vessel and is accumulated to carry out the purification step of the process of this invention. Hence, in this case a means for heating and a means for removing at least a portion of the new enriched melt thus formed is provided in the lower portion of the vessel employed in the separation process of this invention.

For a continuous process carried out according to the most preferred process of this invention employing a non-eutectic binary mixture of components A and B in which A is the crystallizable component, the startup and continuous operation is carried out in the following manner where a tubular vessel is employed. A melt of a binary mixture of A and B is fed into the tubular vessel at a position somewhere between the upper and lower extremities thereof and assuming that the solid rich in the component A will not settle readily, an aqueous immiscible liquid having a density greater than either the melt or the solid rich in A to be formed is charged into the upper portion of the tubular vessel simultaneous with the feed of the melt of the binary. The temperature of immiscible liquid being fed is below the crystallization temperature of component A, but not so low as to cause crystallization of all of the binary mixture charged into the upper portion of the vessel in a finely-divided stream such as by spraying. The droplets of the immiscible liquid being heavier than the melt of the binary passes downwardly therethrough leaving behind a trail of cooled and even supercooled melt in which most of the crystallization takes place. Some crystallization also takes place around the droplet of the immiscible liquid as the droplet moves downwardly through the melt. Thus, there is passing through the melt droplets of the immiscible liquid warming as they pass downwardly through the melt by taking up heat therefrom and thereby forming crystals rich in component A. The simultaneous feeding of the immiscible liquid and the binary melt is continued. At a point near the bottom of the tubular vessel, where there is provided a crystal bed support and heating means or a heated grill support, there accumulates a bed of crystals richer in component A than the binary. The bed of crystals is permitted to accumulate to a sufficient height and density or compactness so that the slight forces of an upwardly moving melt caused by melting the lower portion of the bed of crystals will not create sufficient turbulence to disrupt the bed of crystals or cause channeling therethrough. A portion of the crystalline bed adjacent to the heating means is melted, the melt rich in component A is permitted to contact crystals above and adjacent thereto. A portion of the melt richer in A than the binary melt passes slowly upward contacting crystals rich in A and displaces liquid progressively richer in component B. Crystals enriched in A continue to pass downwardly until they are melted thus forming a melt still richer in component A. This is permitted to continue until there is formed a melt containing preferably an optimum concentration of component A. Thereafter at least a portion of this melt enriched in component A is removed. Since the heat exchange liquid is immiscible with either the binary melt or the melts of either component, the separation of the melt enriched in A from the heat exchange liquid is accomplished within the separation and purification zone of the vessel. Obviously, to prevent the accumulation of the residual melt now rich in component B and lean in component A and to prevent the accumulation of the immiscible liquid, they are also withdrawn from the separation and purification vessel. Obviously, the rates of withdrawal of the warmed immiscible liquid, of the melt enriched in component A, and of the residual melt lean in A are consistent with the maintenance of a material balance. The melt lean in component A rising to the top of the separation and purification vessel can be permitted to overflow the vessel or to be collected in a ring in the upper portion of the vessel located so that the collection ring will not interfere with the introduction of the cooled immiscible liquid. In this case the immiscible liquid being heavier than the solid formed collects in the lower portion of the separation and purification vessel and can be removed from the bottom thereof, passed through an external heat exchange system so as to be cooled to the introduction temperature and recycled to the separation process.

Where the immiscible liquid is heavier than the melt lean in the crystallizable component but lighter than the crystalline solid produced, the warmed immiscible liquid is withdrawn from the separation and purification vessel at a point below the feed of the melt of the multicomponent composition to be separated, but above the point of removal of the melt richer in the crystallizable component of the multicomponent composition.

The following specific examples are intended as illustrations of the process of this invention and it is not desired or intended that they be a limitation thereon.

Example I

Into a melt of a mixture containing 93% by weight p-dichlorobenzene and 7% by weight o-dichlorobenzene at 52° C. in a vertical glass cylindrical column there is sprayed an aqueous solution of calcium nitrate having a density of 1.52 (25° C.) cooled to 25° C. The crystals as they form settle toward the bottom of the cylinder and accumulate upon a heated grid crystal support. A stable bed of crystals of high density forms having a low percentage of void spaces. The grid is heated until a melt of these crystals is formed. This new melt is permitted to contact the crystals adjacent thereto to remove the ortho isomer from the crystals contacted by a reflux like action. A well defined interface forms between this new melt and the brine below. Used brine is withdrawn as is necessary to prevent overflowing of the column, recooled and recycled.

After one hour of operation of this semi-batchwise process a liquid product having a crystallizing temperature of 52.7° C. (pure p-dichlorobenzene has crystallizing temperature of 52.75° C.) was withdrawn at the heated grid. A top liquid product having a para isomer content of 80%, an ortho isomer content of 20% and a crystallizing temperature of 44° C. was obtained.

Example II

The process of Example I is repeated except the calcium nitrate brine is at 7° C. when sprayed into the melt of a melt of a mixture containing 77.5% p-dichlorobenzene and 22.5% o-dichlorobenzene (crystallization temperature of 43° C.). In this process a liquid product having a para isomer content of 95.5% (crystallization temperature of 51.3° C.) is withdrawn from the melt at the grid and a top product crystallizing at 36° C. containing 64% para isomer and 36% ortho isomer is also recovered in less than one hour of operation.

Example III

In the apparatus employed in Example I there is fed intermittently a melt of ortho and para isomers of dichlorobenzene containing 76.5% para isomer and 23.5% ortho isomer (crystallization temperature 42.5° C.) and a spray of aqueous calcium nitrate brine (sp. gr. 1.52 at 25° C.) cooled to 7° C. A top melt lean in para isomer and the warmed calcium nitrate brine at the bottom of the column are intermittently removed. A continuous slurry of crystals formed in about 7 minutes and again a bed of crystals rich in the para isomer is permitted to accumulate and is melted. The new melt is permitted to contact the crystal bed for the purification accomplished by reflux-like action. A liquid product rich in p-dichlorobenzene is removed from the vicinity of the heated grid for a period of over 75 minutes. This product has a crystallization temperature of 52° C. and a para isomer content of 97%. The liquid top product has a para isomer content of 56% and an ortho isomer content of 44% and has a crystallization temperature of 31° C.

Example IV

The process of Example III is made fully continuous by continuously and simultaneously charging a mixture containing equal amounts of p- and o-dichlorobenzene as a melt near the center of a column and a spray of a 10° C. brine of a density at 25° C. of 1.52 into the top of a vertical column having a heated grid crystal bed support near the bottom of the column. After a bed of crystals forms, the grid is heated to melt crystals in contact therewith to provide for the purification of the crystalline product by the reflux-like action hereinbefore described. Warmed brine is removed continuously to keep the para isomer rich product in contact with the grid. When the level of the liquid rich in the ortho isomer reaches the overflow trough near the top of the column, it is permitted to flow out of the column. When the para isomer content of the melt at the grid reaches a concentration of 97% or above, indicated by a crystallization point of about 52° C., a portion of this melt is withdrawn. The rates of feed and removal of liquids are adjusted to maintain the desired liquid levels and crystalline bed level. Such a process produces a liquid product having a p-dichlorobenzene content of 97% and above, crystallization temperature 52° to 52.7° C.

By feeding into a vertical glass column in a process such as described in the above examples, a lubricating oil stock chilled to the cloud point and by spraying into the chilled oil a refrigerated brine having a gravity greater than said oil stock, a top dewaxed oil product is obtained having a pour point 10° C. lower than the original feed lubricating oil stock. The wax removed from the oil is withdrawn from heating zone near the crystal bed support.

While this invention has been described with respect to certain embodiments, it is to be understood that it is not so limited and that modifications and variations thereof obvious to those skilled in the art may be made without departing from the spirit or scope of the invention.

What is claimed is:

1. The process for separating and purifying a crystallizable component of a multicomponent composition, comprising feeding separately to a heat exchange zone (1) a liquid containing said multicomponent composition and forming on initial crystallization a solid having a higher concentration of said crystallizable component than the multicomponent composition, and (2) an immiscible liquid which is at a temperature sufficiently low to cause formation of crystals containing said crystallizable component, but above a temperature which would cause the entire multicomponent composition to crystallize, the crystals having a density different from liquid containing the multicomponent composition, the feed points of the two liquids being so positioned vertically in said heat exchange zone that said liquid multicomponent composition is contacted with said immiscible liquid in countercurrent heat exchange relationship, solidifying from said liquid composition crystals containing a higher proportion of said crystallizable component than the multicomponent composition and simultaneously forming a liquid leaner in said crystallizable component than the initial liquid composition, permitting said crystals to pass from said heat exchange zone to a purfication zone, accumulating said crystals in a bed in said purification zone, heating a portion of the crystals in said bed above their melting point, contacting at least a portion of the remaining crystals with at least a portion of the melted crystals whereby there are obtained crystals enriched in said crystallizable component and melt leaner in said crystallizable component, displacing said leaner melt toward the heat exchange zone, and withdrawing product from the purification zone richer in the crystallizable component than the crystals initially solidified from the liquid charge.

2. The process of claim 1 wherein the process is carried out in a vertical tubular vessel.

3. The process of claim 2 wherein the relative densities of the materials are such that the density of the immiscible liquid is greater than the density of the crystals, which in turn is sufficiently greater than the density of the liquid containing the multicomponent composition to pass toward the bottom of the heat exchange zone under the influence of gravity.

4. The process of claim 2 wherein the relative densities of the materials are such that the density of the crystals is greater than the density of the immiscible liquid, and the density of the immiscible liquid is sufficiently greater than the density of the liquid multicomponent composition to pass toward the bottom of the heat exchange zone under the influence of gravity.

5. The process of claim 2 in which the liquid containing the multicomponent composition is a solution of the multicomponent composition.

6. The process of claim 2 in which the said immiscible liquid is a gas at room temperature and atmospheric pressure and in which the immiscible liquid is permitted to expand to a gas while in said countercurrent heat exchange relationship with the liquid multicomponent composition and thereby cool said composition to a temperature sufficiently low to cause formation of crystals containing said crystallizable component, but above a temperature which would cause the entire multicomponent composition to crystallize.

7. The process for separating and purifying a crystallizable component of a multicomponent composition, said composition forming on initial crystallization a solid having higher concentration of said crystallizable component, which comprises feeding continuously and separately to a heat exchange zone (1) a melt of said multicomponent composition and (2) an immiscible liquid which is at a temperature sufficiently low to cause formation of crystals containing said crystallizable component, but above a temperature which would cause the entire melt to crystallize, the immiscible liquid and the crystals produced from the melt having densities such that they both pass in the same direction under the influence of gravity in the heat exchange zone, the feed points of the melt and the immiscible liquid being so positioned vertically in said heat exchange zone that said melt is continuously contacted with said immiscible liquid in a countercurrent heat exchange relationship, continuously solidifying from said melt crystals containing a higher proportion of said crystallizable component than the multicomponent composition and simultaneously forming a liquid leaner in said crystallizable component than the multicomponent composition, continuously permitting said crystals to pass from said heat exchange zone to a purification zone, continuously accumulating said crystals in a bed in said purification zone, continuously contacting crystals in the said bed with a melt of crystals at least as concentrated in the crystallizable component whereby there are obtained crystals enriched in said crystallizable component and melt leaner in said crystallizable component, continuously supplying heat to said enriched crystals to obtain a melt of enriched crystals, continuously withdrawing melt enriched in the crystallizable component, continuously displacing said melt leaner in crystallizable component toward said heat exchange zone, continuously withdrawing liquid leaner in said crystallizable component than the initial multicomponent composition from the heat exchange zone, and continuously withdrawing the immiscible liquid.

8. The process of claim 7 wherein the process is carried out in a single tubular vertical vessel.

9. The process of claim 8 wherein the relative densities of the materials are such that the density of the immiscible liquid is greater than the density of the crystals, and the density of the crystals is sufficiently greater than the density of the melt of the multicomponent composition to pass toward the bottom of the heat exchange zone under the influence of gravity, and wherein the enriched melt of the crystallizable component and the immiscible liquid are withdrawn separately.

10. The process of claim 8 wherein the relative densities of the materials are such that the density of the crystals of the crystallizable component is greater than the density of the immiscible liquid, and the density of the immiscible liquid is sufficiently greater than the density of the melt of the multicomponent composition to pass toward the bottom of the heat exchange zone under the influence of gravity, and wherein the enriched melt of the crystallizable component and the immiscible liquid are withdrawn separately.

References Cited in the file of this patent

UNITED STATES PATENTS

| | | |
|---|---|---|
| 1,923,419 | Britton | Aug. 22, 1933 |
| 2,438,900 | Cooke et al. | Apr. 6, 1948 |
| 2,491,160 | Bruce | Dec. 13, 1949 |
| 2,656,396 | Hayward | Oct. 20, 1953 |
| 2,701,817 | Rosin | Feb. 8, 1955 |
| 2,744,059 | Mayer | May 1, 1956 |
| 2,757,126 | Cahn | July 31, 1956 |
| 2,780,663 | Gunness | Feb. 5, 1957 |
| 2,813,099 | Weedman | Nov. 12, 1957 |

OTHER REFERENCES

Mattiello: "Protective and Decorative Coatings," vol. I, page 461 (1942).